United States Patent [19]

Inoue

[11] 4,152,047

[45] May 1, 1979

[54] PROJECTION SCREEN MEANS

[75] Inventor: Yasuo Inoue, Hachiouji, Japan

[73] Assignee: Olympus Optical Company Limited, Tokyo, Japan

[21] Appl. No.: 850,147

[22] Filed: Nov. 10, 1977

[30] Foreign Application Priority Data

Nov. 18, 1976 [JP] Japan .................. 51-155099[U]

[51] Int. Cl.$^2$ .......................................... G03B 21/56
[52] U.S. Cl. .................................. 350/122; 350/129
[58] Field of Search .................. 350/122, 129, 211

[56] References Cited

U.S. PATENT DOCUMENTS 3,319,517  5/1967  Rondas et al. .................. 350/122 X Primary Examiner—Richard A. Wintercorn
Attorney, Agent, or Firm—Cushman, Darby & Cushman

[57] ABSTRACT

A screen means free from ghost image comprising a screen and Fresnel lens arranged so that its Fresnel surface faces the screen. The Fresnel lens is arranged that optically inactive surfaces of its Fresnel surface become approximately parallel with the advancing direction of projected rays entered through and refracted by the back surface of the Fresnel lens.

1 Claim, 5 Drawing Figures

PROJECTION SCREEN MEANS

BACKGROUND OF THE INVENTION (a) Field of the Invention

The present invention relates to a screen means in which a Fresnel lens is arranged in the proximity of a screen surface.

(b) Description of the Prior Art

As a high-resolution screen means, a screen means in which a Fresnel lens is arranged in the proximity of the screen is known. By such screen means, the light projected onto the screen is collected toward the observer and, therefore, it is possible to prevent the loss of brightness of the image projected onto the screen and to observe a bright image. For the Fresnel lens, it is known that the section of Fresnel surface is dentate and, therefore, the light is complicatedly reflected and refracted by respective surfaces of Fresnel lens and causes ghost images. As a method for eliminating the ghost images, it may be considered to arrange the back surface of the Fresnel lens as a frosted surface so that the reflected light is scattered by the frosted back surface. By the above method, it is possible to eliminate the ghost images to some extent. When, however, the Fresnel lens is made of plastic such as acrylic resin, flaws such as scratches will be caused to the Fresnel lens at the time of frosting work. It may be considered to form the frosted back surface directly by a mold when forming the Fresnel lens. As, however, it is impossible to use a release agent, the Fresnel lens will be bent when it is separated from the mold.

SUMMARY OF THE INVENTION

It is, therefore, a primary object of the present invention to provide a screen means having a Fresnel lens in which the Fresnel lens is arranged so that its Fresnel surface faces the screen surface and has a section of such shape which does not cause a ghost image.

In a screen means in which a Fresnel lens is arranged in front of a screen, ghost images are caused by unwanted refraction of light by optically inactive surfaces, i.e., surfaces other than optically active surfaces in the Fresnel surface.

In FIG. 1, numeral 1 designates a known Fresnel lens and numeral 2 designates a screen surface. Numerals 1a, 1a', . . . designate optically active surfaces out of the Fresnel surface of the Fresnel lens 1 and numerals 1b, 1b', . . . designate optically inactive surfaces out of the Fresnel surface. In case of the above Fresnel lens, a ray N from a light source is refracted by the optically active surface 1a and reaches a point N' on the screen surface 2. However, a ray M is refracted by the optically inactive surface 1b, reaches a point M' on the screen surface 2 by advancing in a direction different from the ray N and is observed as a ghost image by an observer on the opposite side of the screen 2. When, therefore, it is so arranged that the ray M refracted by the optically inactive surface 1b advances approximately parallel with the ray N which is refracted by the optically active surface 1a, the ghost image is eliminated.

DETAILED DESCRIPTION OF THE PREFERRED EMBODIMENTS

Figure 1:
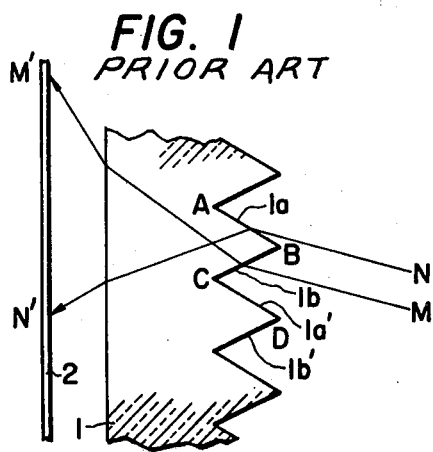
FIG. 1 shows a sectional view illustrating a part of known screen means having a Fresnel lens.
Figure 2:
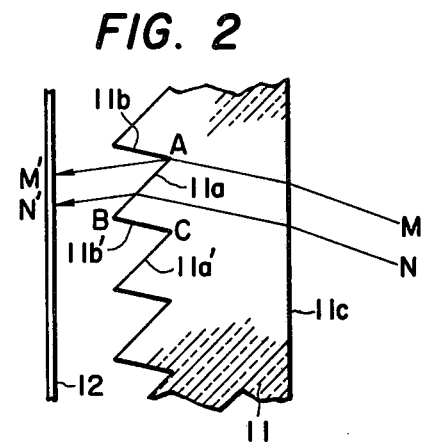
FIG. 2 shows a sectional view illustrating a part of a first embodiment of the present invention.

FIG. 2 shows a part of the first embodiment of the screen means according to the present invention. As shown in this figure, in the screen means according to the present invention, a Fresnel lens 11 is positioned so that its Fresnel surface formed by optically active surfaces 11a, 11a', . . . and optically inactive surfaces 11b, 11b', . . . faces toward a screen 12. Besides, the Fresnel lens 11 is arranged so that optically inactive surfaces 11b, 11b', . . . become approximately parallel with the advancing direction of the ray N from the light source after the ray N is refracted by the back surface 11c of the Fresnel lens 11. By the above arrangement, it is possible to almost perfectly prevent such rays which advance in directions other than the ray N after being refracted by optically inactive surfaces 11b, 11b', . . . and, therefore, it is possible to prevent ghost images almost perfectly.

Figure 3:
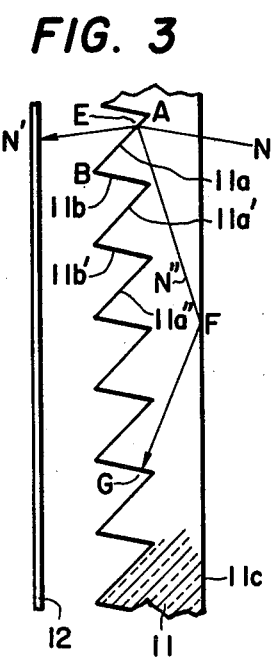
FIG. 3 shows a state of total reflection of rays on the back surface of the Fresnel lens in the first embodiment.
Figure 4:
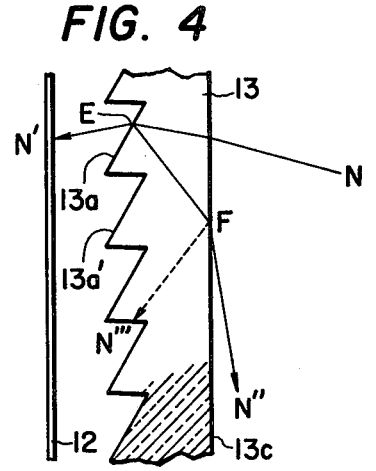
FIG. 4 shows a sectional view illustrating a part of a second embodiment.

The above-mentioned screen means is a favourable screen means which causes almost no ghost image. However, as shown by reference symbol N'' in FIG. 3, rays internally reflected by optically active surfaces 11a, 11a', . . . are totally reflected by the back surface 11c, refracted by other surfaces thereafter, and may reach the screen surface resulting in ghost images. That is, the ray N in FIG. 3 may advance in the direction of E→F→G and reach the screen. The second embodiment shown in FIG. 4 is a more favourable screen means for which the above-mentioned problem is eliminated. In the second embodiment, the Fresnel lens 13 is arranged so that the rays internally reflected by optically active surfaces 13a, 13a', . . . do not cause total reflection on the back surface 13c but pass through the back surface in the direction shown by N'''. In this case, there may be few rays which are internally reflected by the back surface 13c and advance in the direction shown by N''''. However, such rays are very few and, therefore, they cause almost no influence on the image.

Figure 5:
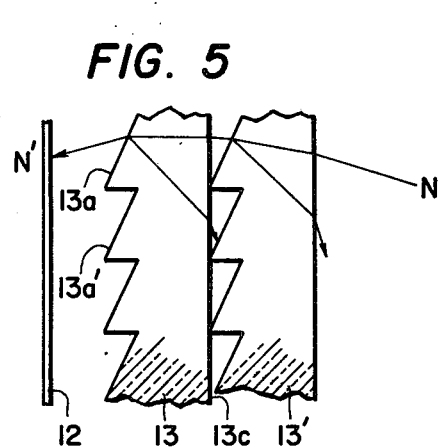
FIG. 5 shows a sectional view illustrating a part of a third embodiment.

By the above-mentioned second embodiment, it is possible to prevent the influence of ghost image almost perfectly. However, as it will be understood also from FIG. 4, it is unavoidable to make the inclination of optically active surfaces 13a, 13a', . . . in respect to the back surface 13c small and, therefore, the focal length of the Fresnel lens necessarily becomes long. As a result, the image as a whole becomes dark and, especially, the quantity of light in the marginal portion may become insufficient. The third embodiment shown in FIG. 5 is a screen means for which the above-mentioned problem is eliminated.

The third embodiment comprises two Fresnel lenses having the shape which are substantially same as the Fresnel lens used in the second embodiment. When two Fresnel lenses are arranged as shown in FIG. 5, the total focal length of the two Fresnel lenses becomes about a half of the focal length of each Fresnel lense. Therefore, it is possible to obtain a bright image even when focal lengths of respective Fresnel lenses are comparatively long. In this case, however, the rays which enter the Fresnel lens 13 are already refracted by the Fresnel lens 13' as it is evident from FIG. 5. Therefore, it is necessary to make the inclination of optically active surfaces 13a, 13a', ... still smaller compared with the Fresnel lens used in the second embodiment. Otherwise, total reflection may be caused on the back surface 13c and may result in a ghost image. To solve the above problem, focal lengths of Fresnel lenses 13 and 13' should be made still longer. As, however, it is possible to make the total focal length satisfactorily short so that the quantity of light will not become insufficient, it is possible to obtain a bright image.

As explained in the above, the present invention provides a screen means which enables to observe a bright image free from ghost images. Especially, by the screen means according to the third embodiment, it is possible to prevent ghost images almost perfectly and, at the same time, it is possible to obtain a bright image.

I claim:

1. A screen means, comprising:
   a screen;
   a Fresnel lens arranged so that its Fresnel surface faces said screen, said screen means being so arranged that projected rays pass through said Fresnel lens and form a projected image on said screen and that the optically inactive surfaces of the Fresnel surface of said Fresnel lens become approximately parallel with the advancing direction of projected rays after those projected rays are refracted by the back surface of said Fresnel lens;
   optically active surfaces of the Fresnel surface of said Fresnel lens being so arranged that rays internally reflected by the Fresnel surface of said Fresnel lens do not cause total reflection on the back surface of said Fresnel lens;
   another Fresnel lens being arranged adjacent to said Fresnel lens, with the Fresnel surface thereof facing the back surface of the first-mentioned Fresnel lens so that said projected rays also pass through said other Fresnel lens.

* * * * *